March 30, 1965   F. AXELSSON   3,175,323
FISHING ROD HANDLE
Filed April 5, 1962
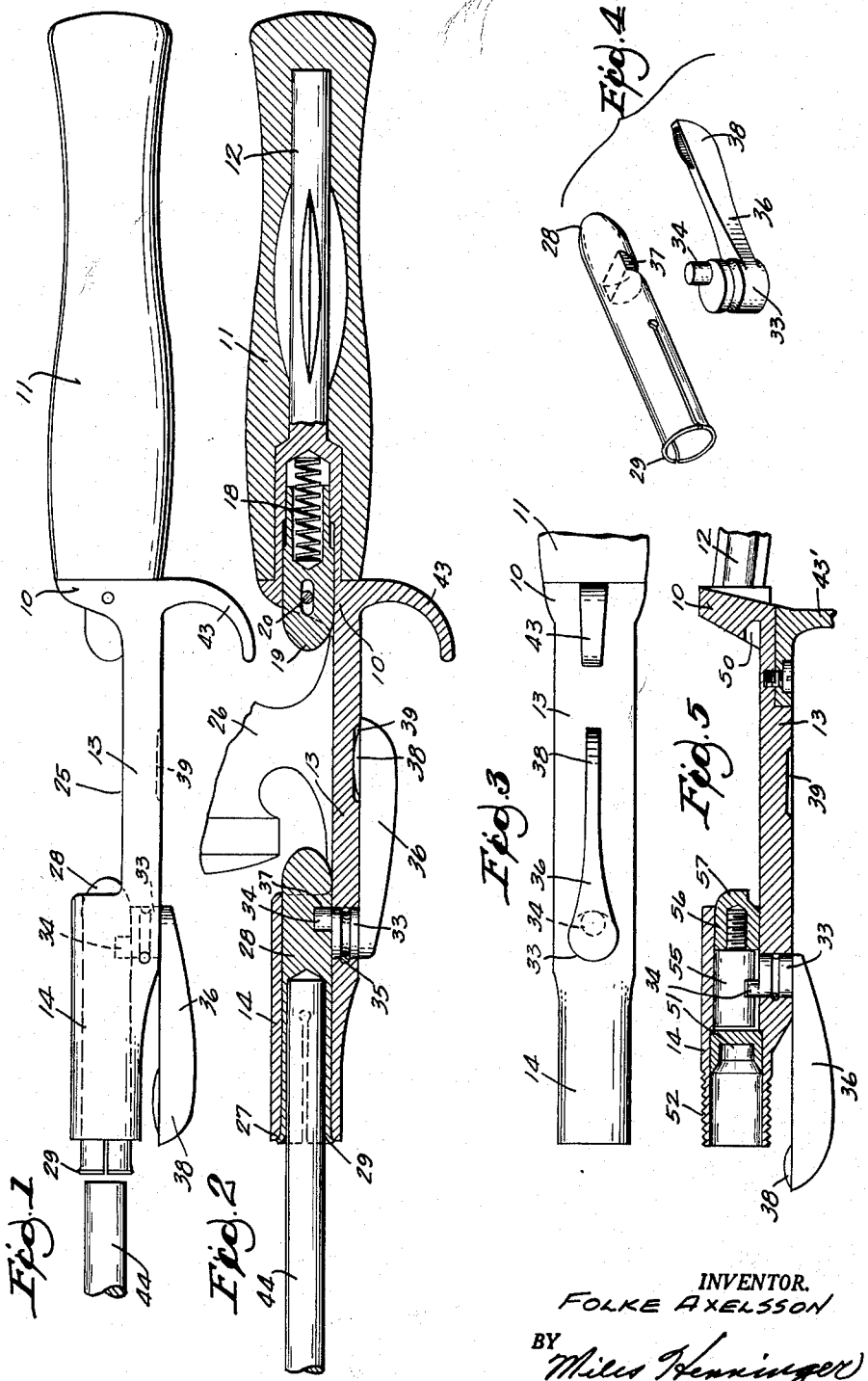
INVENTOR.
FOLKE AXELSSON
BY
Miles Henninger
ATTORNEY

United States Patent Office 3,175,323
Patented Mar. 30, 1965

3,175,323
FISHING ROD HANDLE
Folke Axelsson, Rice Lake, Wis., assignor to St. Croix Corporation, Park Falls, Wis., a corporation of Wisconsin
Filed Apr. 5, 1962, Ser. No. 185,282
2 Claims. (Cl. 43—22)

This invention relates to improvements in handles for fishing rods and particularly to a handle providing a cam-operated plunger for locking a reel on its seat in the handle, but in readily removable relation thereto.

In one modification, a hand grip portion receives a first plunger under spring action to urge the plunger forwardly over a portion of a reel seat in an intermediate handle portion for thereby engaging a reel on the seat. A tubular forward handle portion receives a second plunger which is also partially tubular and is resilient to be compressible and expandable. Arcuate or flared portions on the forward handle portion and on the second plunger tubular portion coact to compress the tubular plunger portion as the two flared portions are drawn together. A pivot with an eccentric stud thereon axially moves the second plunger in the forward handle portion as the pivot is rotated by a lever, thus moving the second plunger into and out of extended position to grip a rod and to bring the plunger nose over a portion of the reel seat for engaging a reel thereon. The lever snaps into and out of a detent notch in the handle to hold the second plunger in rod-gripping and reel-engaging position until a voluntary change is made.

In a second embodiment, a cut-out in the rod handle takes the place of one plunger and an adjustable nose on the other plunger provides for engagement of the reel foot regardless of its size so that the single plunger can now securely hold the reel. The cam and lever for operating the plunger are the same in both embodiments.

Referring to the drawings:
FIG. 1 is a side elevation of a handle ready to receive the reel and with a fragment of a rod in position for entry into the handle,
FIG. 2 is a cross-section of a handle showing a fragment of the reel in seated position and engaged by the plungers in the handle, and a fragment of a rod inserted in the handle,
FIG. 3 is a bottom plan view of a fragment of the handle,
FIG. 4 is an exploded view of a rod socket and reel-holding plunger with its eccentrically movable stud and lever, and
FIG. 5 is a view partially in cross-section and partially in elevation, of a portion of a handle embodying the invention.

Referring more specifically to the drawings, the handle generally comprises a metal portion 10 and a covering 11 of cork or the like in which a hand-grip portion 12 is embedded, and an intermediate portion 13 and a forward portion 14. The hand-grip portion 12 has a socket in which is seated a spring 18 acting against a plunger 19 movable into and out of the socket to an extent limited by a pin 20 extending through a slot in the plunger 19. The nose of the plunger 19 is rounded and projects partially over a relatively wide groove 25 forming a seat for a reel 26 as is indicated in FIG. 2, the reel being held in place in part by the nose plunger 19 extending over the foot of the reel.

The forward end 14 of the handle has a tubular passage with a flared forward end 27 and the tubular passage receives a second plunger 28 generally fitting into the forward handle end and having a flared end 29 coacting with the flared forward handle portion 27. The second plunger is partially tubular and is resilient and slotted so that it may be compressed as the two flares 27, 29 coact or will expand as the two flares are released from one another. The plunger 28 also has a rounded nose at one end projecting partially over the reel seat 25 to engage the reel foot in one plunger position. A hole through the handle forward portion 14 from the bottom thereof receives a cylindrical pivot 33 on which is eccentrically formed a stud 34. A groove about the pivot is engaged by a pin 35 so that the pivot and stud may be rotated but will otherwise remain in position in the handle as a lever 36 is swung from the position shown in FIG. 2 to the position shown in FIG. 4. The stud 34 engages in a notch 37 in the plunger 28 so that the plunger is reciprocated axially in the handle as the lever is moved. The lever 36 is somewhat resilient so that its handle 38 may snap into and out of a notch 39 forming a detent for the lever and its associated parts.

In use, the lever 36, 38 is swung to the position shown in FIG. 1 which moves the second plunger 28 forwardly so that the socket therein can be expanded in full. The rod 44 is then inserted into the plunger and the reel 26 is placed on the seat 25. The lever 36, 38 is then swung to the position shown in FIG. 2 which draws the flare 29 on the second plunger into the flare 27 of the handle forward portion 14 to compress the wall o the tubular plunger portion and grip the rod. At the same time the nose of the plunger 28 projects over the foot of the reel and in coaction with the nose of the plunger 19, retains the reel on its seat. When the lever handle 38 snaps into its detent notch 39, the above parts are locked in place until the lever 36, 38 is voluntarily moved and positively moves the plunger 28 to release the rod and the reel.

Referring now to FIG. 5, the handle portion 10 is cut out to provide a recess 50 of a shape to receive one end of a reel foot and of a size so that the foot of various reels may be held by the recess. The forward end 14 of the handle is again tubular and has a socket member 51 therein to form a seat for the end of the usual fishing rod, the rod being gripped in the handle by the usual nut running on screw thread 52. The balance of the tubular portion 14 houses a plunger which has a solid plug-like portion 55 and which is slotted to receive the cam stud 34. A screw threaded projection 56 from the plug 55 receives a plunger nose member 57 adjustable by screwing into and out of the stud 56. Thus coaction between the recess 50 and the plunger nose 57 readily adjusts to receive and hold the foot of various sizes of reels. It will be noted that finger grip 43' is now a separate member attached to the reel handle to simplify the shaping of the handle.

It will thus be seen that the one embodiment of the present construction provides one impositively movable and one positively movable plunger for holding a reel on its seat and for gripping the butt end of a rod. The positively movable plunger is actuated by a camming device which with its lever, is locked in position when the reel is seated thus both locking the reel in place and gripipng the end of the rod until the reel is released. In the second embodiment, the positively movable plunger has an adjustable nose and only one end of the foot of the reel is engaged thereby while the other end of the reel foot seats in a recess.

I claim:
1. In a handle for receiving a fishing rod and a reel thereon, a metallic member having a hand-grip and an intermediate portion and a forward portion, the intermediate portion having a seat for the reel, a first plunger mounted in the hand-grip, a spring to urge the first plunger over a portion of the reel seat, a second plunger mounted in the forward handle portion, a pivot rotatably mounted in the forward handle portion and having a stud extending eccentrically therefrom for engaging with the second plunger for camming action thereon and movement thereof in and out of the forward handle portion, and a lever for moving the stud in an arc, the plungers coacting to hold the reel on the seat.

2. In a handle for receiving a fishing rod and a reel thereon, a metallic member having a hand-grip and an intermediate portion and a forward portion, the intermediate portion having a seat for the reel, the intermediate portion having a notch therein, a first plunger mounted in the hand-grip, a spring to urge the first plunger over a portion of the reel seat, a second plunger mounted in the forward handle portion, a pivoted stud in the forward portion and engaging the second plunger for camming action thereon and movement thereof axially in and out of the forward portion, and a resilient lever for rotating the stud and engageable in the intermediate portion notch for retaining the second plunger in position to coact with the first plunger in holding the reel on the seat.

References Cited by the Examiner
UNITED STATES PATENTS

| | | | |
|---|---|---|---|
| 2,443,567 | 6/48 | Moulton | 43—22 |
| 2,483,519 | 10/49 | Bishoff | 43—22 |
| 2,485,144 | 10/49 | Espenship | 32—22 |
| 2,538,338 | 1/51 | Sturdevant | 43—22 |
| 2,756,531 | 7/56 | Hollenshead | 43—22 |
| 2,777,240 | 1/57 | Hutchison | 43—22 |
| 3,034,798 | 5/62 | Portz | 43—23 |

ABRAHAM G. STONE, *Primary Examiner.*

MELVIN D. REIN, *Examiner.*